(No Model.) 2 Sheets—Sheet 1.
N. A. WHEELER.
WAGON BRAKE.
No. 430,050. Patented June 10, 1890.
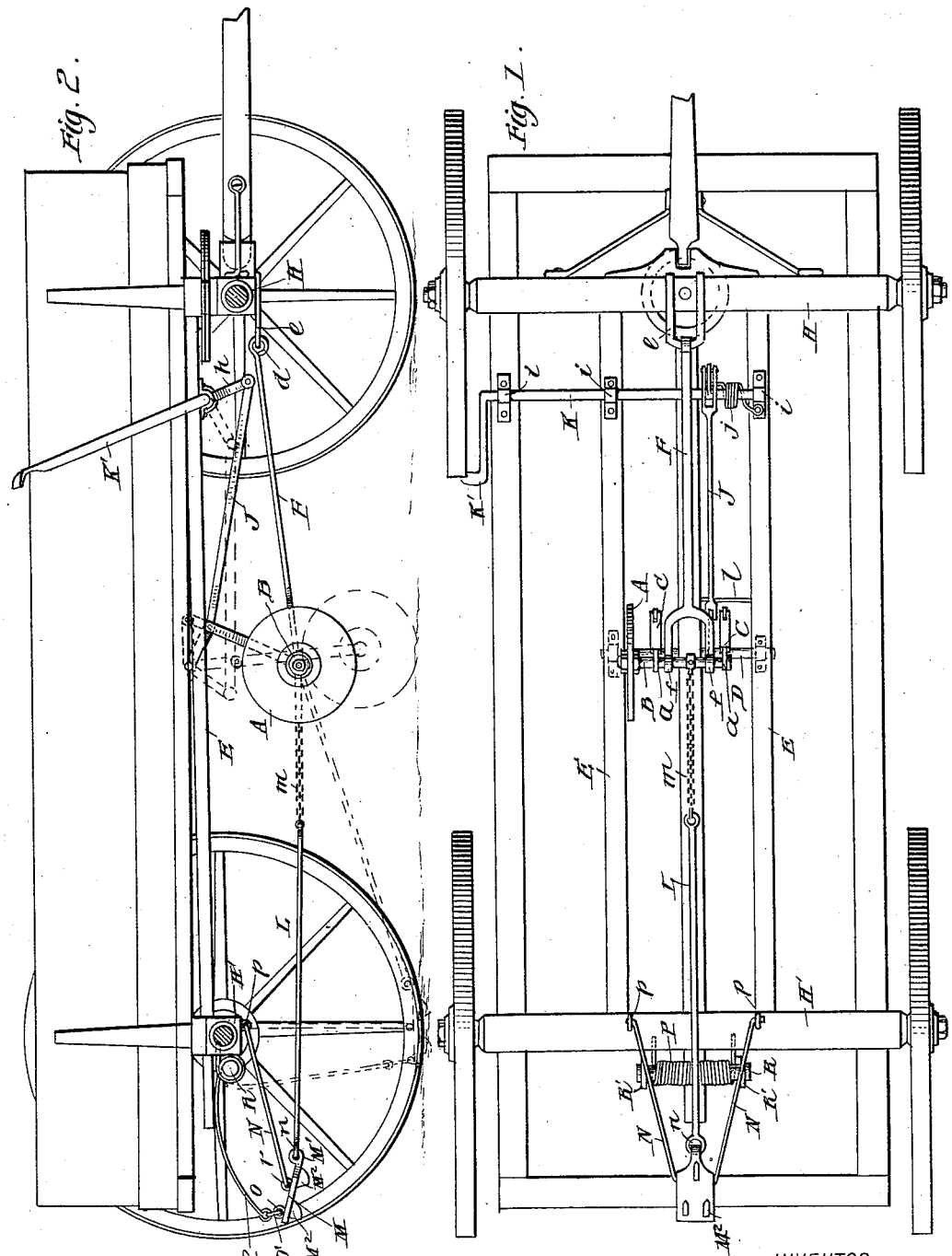
WITNESSES:
W. R. Davis
C. Sedgwick
INVENTOR:
N. A. Wheeler
BY Munn & Co.
ATTORNEYS (No Model.) 2 Sheets—Sheet 2.
N. A. WHEELER.
WAGON BRAKE.
No. 430,050. Patented June 10, 1890.
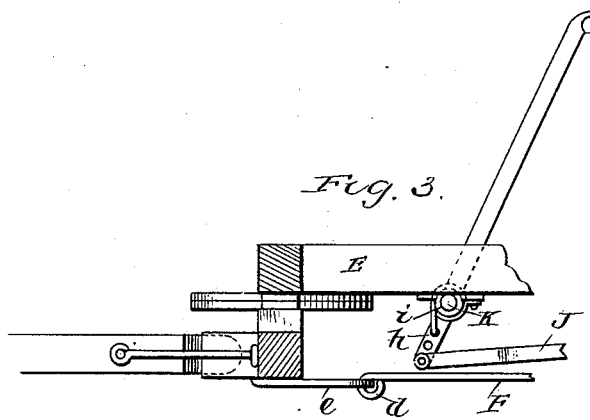
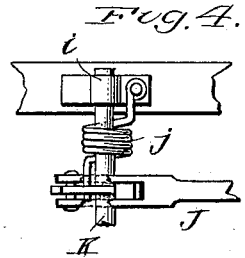
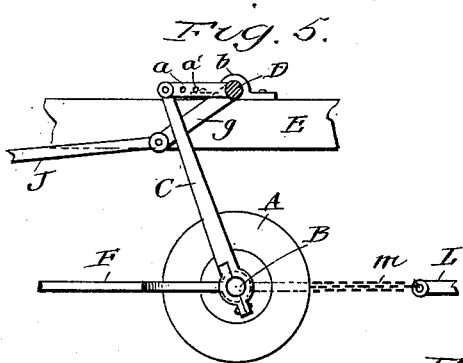
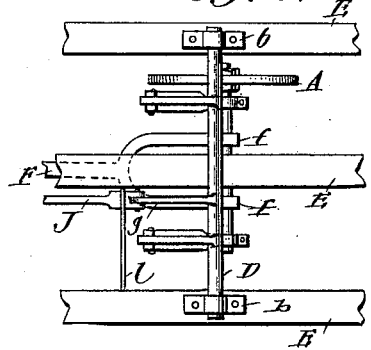
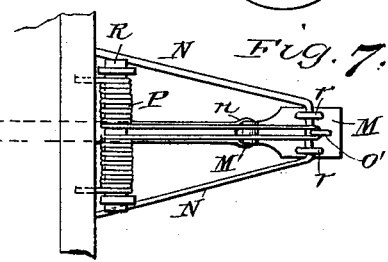
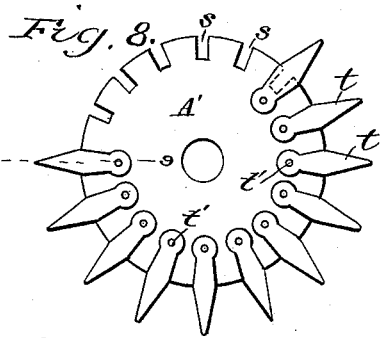
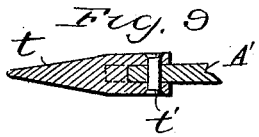
WITNESSES:
W. R. Davis
C. Sedgwick
INVENTOR:
N. A. Wheeler
BY Munn & Co
ATTORNEYS

UNITED STATES PATENT OFFICE.

NATHAN A. WHEELER, ALPOWA, WASHINGTON.

WAGON-BRAKE.

SPECIFICATION forming part of Letters Patent No. 430,050, dated June 10, 1890.

Application filed February 19, 1890. Serial No. 341,008. (No model.)

*To all whom it may concern:*

Be it known that I, NATHAN A. WHEELER, of Alpowa, in the county of Garfield and State of Washington, have invented a new and Improved Wagon-Brake, of which the following is a full, clear, and exact description.

My invention relates to improvements in wagon-brakes, and the object of my invention is to provide a strong and durable brake that can be easily applied; that is not applied to the vehicle-wheels, thus preventing the extra wear of the ordinary brake upon the tire; that will effectually brake a vehicle in the middle of the steepest hill, and that will be equally effective upon soft or frozen ground.

To this end my invention consists in certain features of construction and combinations of parts that will be hereinafter fully described, and specifically pointed out in the claims.

Reference is to be had to the accompanying drawings, forming a part of this specification, in which similar letters of reference indicate corresponding parts in all the figures.

Figure 1 is an inverted plan view of the device as applied to a wagon. Fig. 2 is a side elevation of the same with the wagon-wheels removed from one side of the wagon. Fig. 3 is a partial side elevation, partly in section, showing the manner in which the device is connected with the brake-lever and with the front axle of the wagon. Fig. 4 is a partial inverted plan view showing the connection between the brake-lever and the rod which operates the friction-disk. Fig. 5 is a partial side elevation showing the manner in which the friction-disk is suspended from the wagon-body and connected with the brake-lever and brake-shoe. Fig. 6 is a partial inverted plan view of the same. Fig. 7 is a partial plan view of the brake-shoe and its suspending rods and springs. Fig. 8 is a side elevation of a modified form of disk that is used upon icy roads; and Fig. 9, a cross-section on the line 9 9 of Fig. 8, showing the manner in which the teeth are attached to said disk.

Suspended beneath the wagon-body and about midway between the forward and rear axles thereof is a friction-disk A, which is made of metal and is fixed to an axle B, which is supported by and turns in the stirrups C. The stirrups C are bored out at their lower ends to receive the axle B, and extend upwardly, and are pivotally attached at their upper ends to the cranks $a$, which are of equal length and project from the shaft D, near each end thereof.

The shaft D is parallel with the wagon-axles and turns in suitable boxes $b$, which are supported by the wagon-girders E. The cranks $a$ are provided with holes $a'$, which are regularly spaced therein, so that the stirrups C may be attached thereto at different points, thus changing the length of the connection between the friction-disk A and the shaft D. The above arrangements will allow the disk A and axle B to be moved vertically, so that the disk may be placed in contact with the ground or raised to a point near the wagon-girders, as shown by full and dotted lines in Fig. 2.

The disk and axle are prevented from moving backward and forward, and the axle is held in proper alignment by the bar or brace F, one end of which is provided with a hook $d$, which engages an eye $e$, attached to the lower side of the front axle H, so as to extend rearwardly therefrom, and the other end of which is forked, as shown, and each fork ends in a terminal eye $f$, through which passes the axle B. The eyes $f$ will thus be near each end of the axle B and will prevent it from twisting. By connecting the brace F and axle B in this manner the axle and disk A thereon will be effectually prevented from moving backward and forward, while the brace F, being pivoted at the forward end by the hook $d$ to the eye $e$, will not interfere with the vertical motion of said parts.

The friction-disk A is raised and lowered by the connecting-rod J and brake-lever K and their connections. The connecting-rod J is split, as shown, at each end. Its rear end is pivotally attached to a projecting crank $g$ of the shaft D, and its forward end is pivotally attached to a depending crank $h$ of the brake-lever K.

The brake-lever K extends across the under side of the girders E of the wagon near the forward axle H, turning in suitable brackets $i$, by which it is suspended, and near the end is bent, so as to extend upwardly beside the wagon-body that it may be easily reached by the foot of the driver. At the end of the brake-lever K, beneath the wagon-body and near the connecting-rod J, is a spiral spring *j*, which is coiled around the brake-lever, one end of the spring being attached to a girder E and the other end to the brake-crank *h*. The spring will thus hold the crank *h* thrown forward.

When the bent portion K' of the brake-lever K is thrown forward, it will cause the brake-lever to turn in the brackets *i* and throw the crank *h* backward. This will throw the connecting-rod J backward, and the connecting-rod will actuate the crank *g* of the shaft D, forcing the crank downwardly and backwardly. The crank *g* will thus turn the shaft D, causing the cranks *a* to be turned downwardly, and these, acting on the stirrups C and axle B, will depress the axle and throw the disk A thereon into contact with the ground. When the pressure is removed from the brake-lever, the spring *j* will throw the crank *h* forward, and this, acting upon the parts named, will reverse the above-described action, and the various parts will be thrown into their normal position. When the parts are thrown back into position, the upward movement of the crank *g* and the rear end of the connecting-rod J will be determined by the rod *l*, which extends between two girders E above the connecting-rod J. The rod *l* will thus hold said parts in a slightly-depressed position, so that when pressure is applied to the brake-lever the crank *g* will be sure to turn beneath the shaft D.

Attached to the disk-axle B is a chain *m*, the other end of which is attached to a rearwardly-extending brake-rod L. The rear end of the brake-rod L is provided with a terminal eye *n*, which engages a hook M' upon the upper side at the forward end of a brake-shoe M, constructed of metal and of any suitable shape. Said brake-shoe is provided with eyes *r* upon each side near the center, through which pass the suspending rods N, and with an eye *o*, near the back part thereof, to which is attached the spring P, by which the shoe is held in elevated position. The under side of the brake-shoe is provided with projecting spurs M², which enables the shoe to take firm hold upon the ground, although when the roads are not icy a smooth shoe may be used with good effect.

The suspending rods N pass through the eyes *r* of the brake-shoe, and are then bent upwardly and outwardly to give them a good bracing effect, and their ends are pivotally attached to the rear axle H' by the brackets *p*.

The spring P is wound upon a drum R, and is held in position thereon by collars R' at each end of the drum. Each end of the spring P is attached to the back side of the rear axle H', and the central part of the spring is doubled and extends rearwardly from the drum R, and is connected by a link *o'* with the eye *o* of the brake-shoe. The spring P will thus normally hold the brake-shoe in elevated position, as shown in the drawings.

The device is operated as follows: The driver moves the bent portion of the brake-lever K forward and downward by hand, places his foot on the treadle K' and presses it downward, which will throw the friction-disk A into contact with the ground in the manner already described. When the disk A strikes the ground, the motion of the vehicle will cause it to turn, and in turning it will turn the disk-axle B and wind the chain *m* thereon. As the chain *m* is wound upon the axle B it will pull the brake-rod L forward, and this, acting upon the brake-shoe M and rods N, will cause the brake-shoe to swing downwardly to the ground, where it will act as a drag and have a tendency to stop the wagon. By increasing the pressure upon the brake-lever the disk A will be forced more firmly upon the ground, which will force the brake-shoe M forward and downward to such an extent that, acting on the rods N, it will lift the rear wheels of the wagon from the ground and bring it to a full stop, even if it is in the middle of a steep and icy hill. When the pressure is removed from the brake-lever, the spring *j* will raise the disk A in the manner described, and the spring P will raise the brake-shoe M and unwind the chain *m* from the disk-axle B, when the device is ready for another operation.

In Fig. 8 I have shown a disk A', which may be substituted for the disk A when the roads are frozen and icy. The disk A' is provided around its edge with radial slots *s*, into which fit projecting teeth *t*, which overlap the disk and are fastened thereto by the bolts or rivets *t'*, so that when the teeth become dull they may be removed and sharpened.

When the road is not slippery, a smooth brake-shoe and disk may be used, and if the vehicle is not extremely heavy the brake-shoe may be dispensed with and the friction-disk will furnish the necessary resistance.

The device is especially adapted to mountain roads, as it not only makes an effective brake, but it also prevents the vehicle from slipping out of the road where the road has become sideling and icy. I have shown my invention as applied to a wagon; but it is obvious that it may be applied to any vehicle.

Having thus described my invention, what I claim as new, and desire to secure by Letters Patent, is—

1. A wagon-brake consisting, essentially, of a disk fixed to an axle or shaft and suspended by toggles from a shaft mounted upon the girders of a wagon, a suitable brace attached to the axle of the disk and pivoted to the forward wagon-axle so as to hold said disk and axle in position, and a suitable rod connecting said toggles with a brake-lever, so that the disk may thereby be forced down into contact with the ground, substantially as described.

2. A wagon-brake consisting, essentially, of a disk fixed to an axle and suspended by stirrups and cranks, as shown, from a shaft mounted upon the wagon-girders, a suitable brace attached to said disk-axle and pivoted to the front wagon-axle to hold said disk-axle in position, a brake-lever mounted in brackets upon the wagon-girders and extending upwardly at the side of the wagon-body, a rod connecting a crank of the disk-suspending shaft with a crank of the brake-lever, whereby by actuating the brake-lever the disk may be moved vertically, as shown, and a spring coiled upon the brake-lever and attached to a girder and to a crank of the brake-lever in such a manner that the disk and its axle will be thereby held normally in an elevated position, substantially as described.

3. In a wagon-brake, the combination, with a frictional disk suspended beneath a wagon-body, and having means, as shown, for throwing it into contact with the ground, and with the axle or shaft to which said disk is fixed, of a brake-shoe pivotally attached to the rear wagon-axle and held in elevated position by a suitable spring, and a brake-rod and chain connecting said brake-shoe with the disk-axle, so that when the disk revolves the chain will be wound upon the disk-axle and the brake-shoe forced into contact with the ground, substantially as described.

4. A wagon-brake consisting, essentially, of a frictional disk fixed to an axle and suspended beneath the wagon-body, said disk having suitable connection with a brake-lever, so that it may be forced into contact with the ground, a brake shoe or drag pivotally connected by suitable rods with the rear wagon-axle and provided with a spring to hold it in elevated position, and a connecting rod and chain connecting said brake-shoe with the disk-axle, so that when the chain is wound upon the disk-axle the brake-shoe will be forced down into contact with the ground, substantially as described.

5. The combination, with the axle B, having the disk A fixed thereto, and having means, as shown, for raising and lowering the same, of the brace F, pivoted to the front axle, as shown, and provided with a forked end having eyes $f$ to engage the axle B and hold the same in position, substantially as described.

6. The combination, with the axle B, having means, as shown, for operating the same, of the disk A', having slots S therein and having the teeth $t$ fixed in said slots, substantially as described.

NATHAN A. WHEELER.

Witnesses:
E. S. WHITMAN,
E. V. KUYKENDALL.